W. P. HUGUELET.
ENVELOP MACHINE.
APPLICATION FILED MAY 9, 1916.

1,253,383.

Patented Jan. 15, 1918.
8 SHEETS—SHEET 4.

William P. Huguelet
INVENTOR.
BY
ATTORNEYS.

W. P. HUGUELET.
ENVELOP MACHINE.
APPLICATION FILED MAY 9, 1916.

1,253,383.

Patented Jan. 15, 1918.
8 SHEETS—SHEET 6.

William P. Huguelet
INVENTOR.

BY
ATTORNEYS.

Fig. 15.

UNITED STATES PATENT OFFICE.

WILLIAM P. HUGUELET, OF CHICAGO, ILLINOIS.

ENVELOP-MACHINE.

1,253,383.   Specification of Letters Patent.   Patented Jan. 15, 1918.

Application filed May 9, 1916. Serial No. 96,378.

*To all whom it may concern:*

Be it known that I, WILLIAM P. HUGUE-LET, a citizen of the United States, residing at Chicago, in the county of Cook and State of Illinois, have invented new and useful Improvements in Envelop-Machines, of which the following is a specification.

This invention relates to machines which make envelops from a continuous web by means of rotary elements which cut out the blanks and gum and fold the same to complete the envelops.

The invention relates more particularly to machines which form envelops of the center seam type and its object is to provide a simple and effective machine of this kind for making envelops of various sizes, this being effected by a simple interchange of certain parts of the mechanism, as will be described in detail hereinafter.

A further object of the invention is to provide a novel and improved means for folding the side and bottom flaps of the blanks.

Other objects and advantages of the invention will be pointed out in the detailed description appearing hereinafter, reference being made to the accompanying drawings in which—

Referring specifically to the drawings, the frame of the machine comprises laterally spaced side members having a base 21, a top rail 20, end uprights 22 and 23, respectively, and an intermediate upright 24, these parts being usually cast in one piece.

Extending forward from the uprights 22 are brackets 25 having at their outer ends bearing recesses 26 for a horizontal shaft 27 extending transversely of the machine and carrying cones 28 which support the roll 29 of paper from which the envelops are to be made. The shaft 27 is provided with a take-up or braking device consisting of a drum 30 mounted on one end of said shaft and engageable by a split band composed of two sections 33 and 34, respectively. Adjacent to the shaft 27, one of the brackets 25 has an extension 32 into which is threaded a short shaft or rod 31, the latter forming a hinge connection for one end of the parts 33 and 34. The opposite ends of these parts have outstanding ears 35 provided with slots, and to one of these ears is pivoted, as indicated at 37, a bolt 38 which is so located that it may be swung into and out of the slots. The bolt carries a nut 39 which may be operated to clamp the parts 33 and 34 around the drum 30 to obtain the desired braking action. The outer end of the shaft 31 has a hand wheel 32$^a$ for longitudinal adjustment of said shaft, so that the parts 33 and 34 may be properly engaged with the drum 30. The braking or take-up device hereinbefore described prevents the paper strip from unrolling too fast, and takes up any slack in the same.

The strip of paper is indicated at 40. From the roll 29 the paper strip passes to a guide roller 41 positioned between the uprights 22 slightly below the level of the shaft 27. This roller is journaled in bearing blocks 42 which are vertically slidable in frames 43 secured to the inner faces of the uprights 22. Above the bearing blocks 42 in each frame 43 is a stout coiled spring 44 which serves to depress the block and the roller 41, to take the curl out of the paper strip as it comes from the roll. A screw 45 threaded through the top of the frame 43, is provided for the purpose of adjusting the tension of the spring 44. The machine is provided with a number of yieldable shaft bearings of the type just described, some of which, however, do not employ a spring but only a screw to raise or lower the bearing block. No novelty is claimed for these devices, and the only purpose for using them is to render the shaft yieldable with the use of the spring, or to render the shaft readily adjustable for leveling and accuracy of contact by means of the screws. Hence, for the sake of convenience the first-mentioned type will be called a yieldable bearing and the other an adjustable bearing.

The paper strip 40 passes upward from the roller 41 and is trained over a roller 47 which is journaled in the uprights 22, and then it continues in a practically horizontal path rearward to be operated on by the cutting, paste applying and folding devices.

The first unit of the mechanism which the paper strip 40 encounters is a pair of superposed main feed rollers 48 and 49, respectively, the roller 48 being at the top. The next unit is a pair of auxiliary feed rollers 55 and 56, the roller 55 being at the top. These rollers, as well as all the other rollers to be described later, extend transversely of the machine in horizontal position, and they are for the most part journaled by means of their shafts in the top rails 20 of the frame.

The shaft 50 of the feed roller 48 is journaled in yieldable bearings 51, and the shaft 52 of the roller 49 is journaled in the top rails 20 of the frame. These two last-mentioned rollers are in vertical alinement and they are short and do not extend throughout the entire width of the machine as their only function is to propel the paper strip; they also differ in diameter, the bottom roller 49 being the larger. The auxiliary feed rollers 55 and 56 are mounted in the same manner as the main feed rollers 48 and 49, the roller 56 being of greater length than the roller 49, but of the same diameter, and the roller 55 being of the same length and diameter as the roller 48.

Back of the roller 56, in the same horizontal plane, is a shaft 57, and back of this shaft is a roller 58 of the same diameter as the rollers 49 and 56, the shaft 57 and the roller 58 being journaled in the top rails 20 of the frame. Above the roller 58 is a roller 59 of the same length and diameter and carried by a shaft 60 which is journaled in special bearings to be described later. The paper strip passes between the rollers 58 and 59 after it leaves the auxiliary feed rollers 55 and 56.

The hereinbefore described assembly of rollers, four of which are of the same diameter, is designed for the purpose of feeding the paper, and these rollers are connected by gears and driven by an electric motor 61 set on a shelf 62 directly below the shaft 57. Of course, it will be understood that any other suitable power source may be provided. The motor 61, through a pair of gears 63, transmits motion to a gear 64 fast on one end of the shaft 57. The shaft 57 has two gears 64$^a$ and 65 within the space between the top rails 20 of the frame, and on the outside of one of said rails the shaft 57 has a pinion 66 on the side opposite to that side carrying the gear 64. By means of two independently journaled intermediate gears 67 and 68, the pinion 66 transmits motion to a gear 69 fast on one end of the shaft 52 carrying the roller 49. Inside the top rails 20 the shafts of the rollers 49, 56, 58 and 59 are provided with intermeshing gears 70, 71, 72 and 73, respectively, all of the same size and driven by a gear 65 fast on the shaft 57. The gear 70, however, is loosely mounted on the shaft 52, and said shaft receives motion from the shaft 57 through the gears 67, 68 and 69 as hereinbefore described. The purpose of having the gear 70 loose on the shaft 52 will be explained hereinafter. Inside the rails 20 the shaft 52 of the roller 49 carries a loose gear 70$^a$, and the roller 56 carries a loose gear 71$^a$, these gears being identical with their mates 70 and 71, the gear 71$^a$ being driven by the gear 64$^a$ and driving the gear 70$^a$. The gear 71 is loose on the shaft of the roller 56. The purpose of the gear 64$^a$ is to impart motion to the roller 56 at both ends, for easy operation.

The gears 70 and 71, as well as gears 70$^a$ and 71$^a$, carry disk cams 74 and 75, respectively, and the shafts of the rollers 48 and 55 carry two collars 76 each adapted to follow the contour of said cams. The cams 74 have a projection 77, while the cams 75 have a depression 78 in their peripheries, the drive gearing being set so that the projection and the depression are always in the same horizontal plane, i. e., both reach the top or the bottom at the same time. Thus, the roller 49 is able to feed nearly an entire revolution, while the roller 56 feeds during the remainder of the time, or when the roller 49 does not feed.

As the frictional engagement of each pair of feed rollers serves to propel the paper, it will be seen that the rise of either the roller 48 or 55 will loosen the grip on the paper strip at that particular point. Thus, the rollers 48 and 49 feed the paper strip all the time except when the roller collar 76 mounts the cam projection 77, and during the time the rollers 48 and 49 feed the paper strip, the collar 76 of the roller 55 follows the periphery of the cam 75, keeping the roller 55 elevated and free of the paper strip which is being fed forward by the rollers 48 and 49. However, when the collar 76 of the roller 48 mounts the cam projection 77, the collar 76 of the roller 55 falls into the depression 78 of the cams 75, so that for a limited time the rollers 55 and 56 only are feeding the paper. The object of this arrangement of main and auxiliary feed rollers operating alternately is to enable the machine to be used for making envelops of different sizes, as will be described hereinafter.

Figures 4, 5:
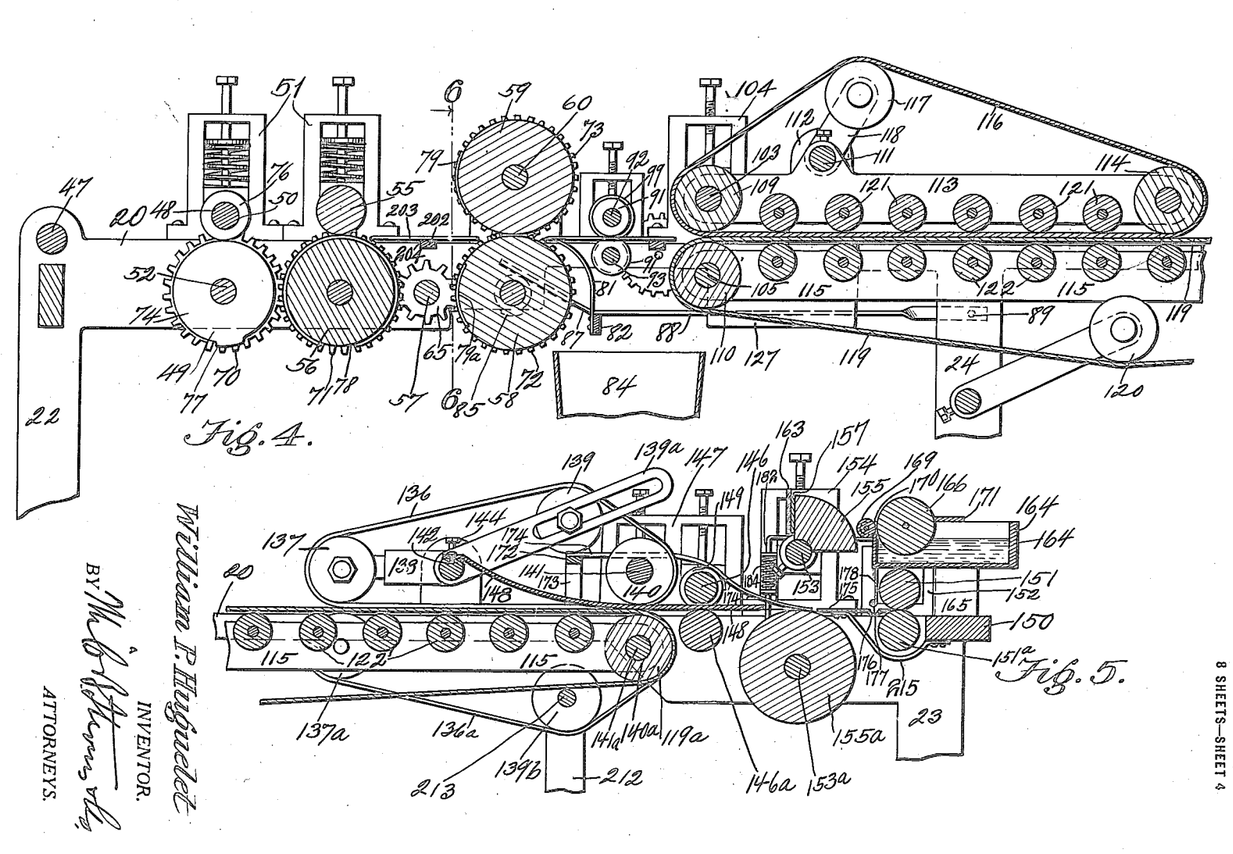
Figs. 4 and 5 are enlarged complements of a section on the line 4—5 of Fig. 3.
Figure 6:
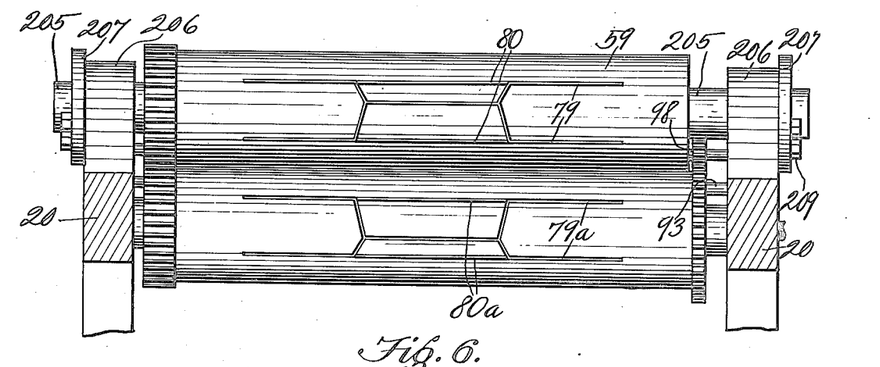
Fig. 6 is a section on the line 6—6 of Fig. 4.

The rollers 59 and 58, more clearly shown in Figs. 4 and 6, cut the envelop blank from the paper strip, and also make two transverse creases defining the top and bottom flaps of the blank. The roller 59 is armed with knives 79 and creaser strips 80 arranged as clearly shown in Fig. 6, and the roller 58 has grooves 79ª and 80ª corresponding to the knives and creaser strips. The knives and creaser strips are arranged to cut out opposite edges of the paper strip and to sever the strip midway between the cut out portions, and, furthermore, to make creases in the strip transversely in line with the opposite edges of the cut out portions to form the top and bottom flaps of the envelop blank. The side portions of the paper strip which remain intact form the side flaps of the envelop blank.

The rollers 56 and 58 are geared to run in the same direction and at the same rate of speed, this feature making it certain that the roller 56 can feed the paper strip uniformly, while the rollers 59 and 58 cut and crease the strip. The cutting and creasing operation consumes a limited time, and the rollers 55 and 56 only feed the paper strip at this time, this being made possible by the operation of the cams 75 hereinbefore described.

If the machine is to make a larger envelop, it will be necessary first to change the knives, etc., of the rollers 59 and 58. This will not affect the machine so far as the width of the envelop is concerned as the rollers 59 and 58 are sufficiently long for this purpose. The increased length of the envelop will affect the machine, however, as the roller 56 would ordinarily turn too slowly. Hence, it will be necessary to speed up the rollers 48 and 49 so that they will push along a greater length of paper strip between the rollers 55 and 56 and the cutting rollers 58 and 59. This is possible because with the main feed rollers 48 and 49 feeding most of the time, the auxiliary feed rollers 55 and 56 will be in spaced relation and will let the paper strip slide freely therebetween; also it will be noted that the rollers 58 and 59 do not propel the paper strip, the knives and creasers only functioning. Hence, the paper strip can be easily slipped between these rollers as long as the knives have not met the grooves of the roller 58.

The function of the loose gears 70 and 70ª is to actuate the cams 74 at the same rate of speed as the cutting rollers 58 and 59, to obtain the results hereinbefore noted. However, as far as the roller 49, actuated by the gear 69, is concerned, the making of longer envelops requires a greater speed for said roller, and to obtain this necessitates only a change in the gears 67 and 68. It will be remembered that the rollers 48 and 49 are in contact most of the time, whereas the rollers 55 and 56 are in contact only for a short period, and the rollers 58 and 59 are always spaced, only the knives 79 and creaser strips 80 meshing during a part of the revolution with the grooves 79ª and 80ª. Now, assuming that the rollers 55 and 56 are out of contact, and the knives and creaser strips have not yet met the grooves, the rollers 48 and 49, at a given speed, project a certain length of paper through the space between the pairs of rollers 55, 56 and 58, 59. It will be evident that if the rollers 48 and 49 are sped up, a greater length of paper is projected forward through the spaces between the rollers 55, 56 and 58, 59 during the same length of time it took to project a shorter length. Any combination of gears 67 and 68 may be interposed between the gears 66 and 69; or the gear 69 can be removed and a smaller one substituted therefor to obtain more speed for the roller 49.

Figure 9:
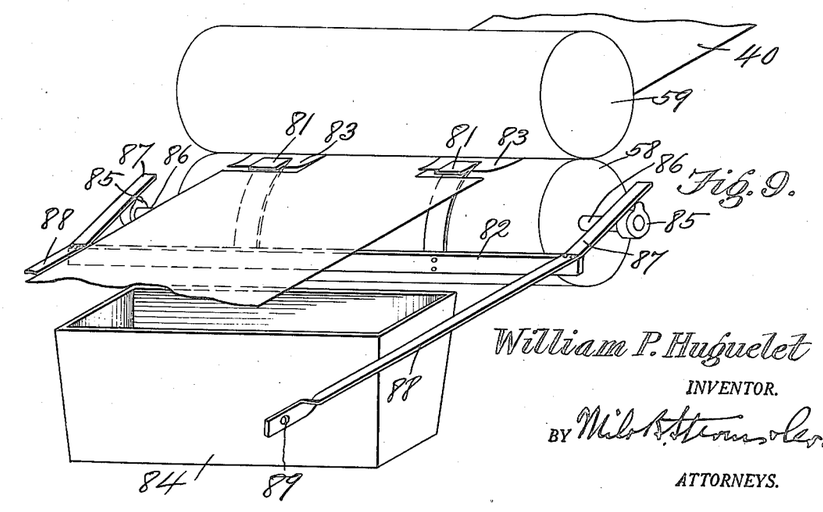
Fig. 9 is a perspective view showing a device for removing the cut out portions of the strip.

As the blank cut from the paper strip issues from the rollers 58 and 59, the device shown more particularly in Fig. 9 is met. This comprises two claws 81 carried by a cross bar 82 and located directly under the blank as it issues from between the rollers, and near the edge of the blank beneath the two waste pieces 83 cut out by the knives. As the blank advances, the claws rise, and push up against the material just ahead of the waste pieces, after which they drop back, thus deflecting the waste pieces. The motion of the rollers 58 and 59 will force the waste pieces downwardly, while the remainder of the blank continues in a level path, and said waste pieces will drop into a suitable receptacle 84 which latter may also be made in the form of a hopper fitted with an exhaust fan to promote the immediate discharge of the waste pieces.

The action of the claws 81 is governed by a cam 85 at each end of the shaft 86 of the roller 58, the cam acting on the inclined portion 87 of a side lever 88 which is pivoted to the upright 24 as indicated at 89. At an intermediate point, the levers 88 take the ends of the cross bar 82. The envelop blank next passes between a pair of creaser rollers 91, these being mounted in laterally spaced relation on parallel and vertically spaced shafts 92 and 93, respectively. The shaft 92 is journaled in adjustable bearings 94, while the shaft 93 is journaled in the top rails 20. The creaser rollers 91 are positioned to crease or score the blank in line with the inner edges of the cut out portions, to define the side flaps of the envelop blank.

Figure 1:
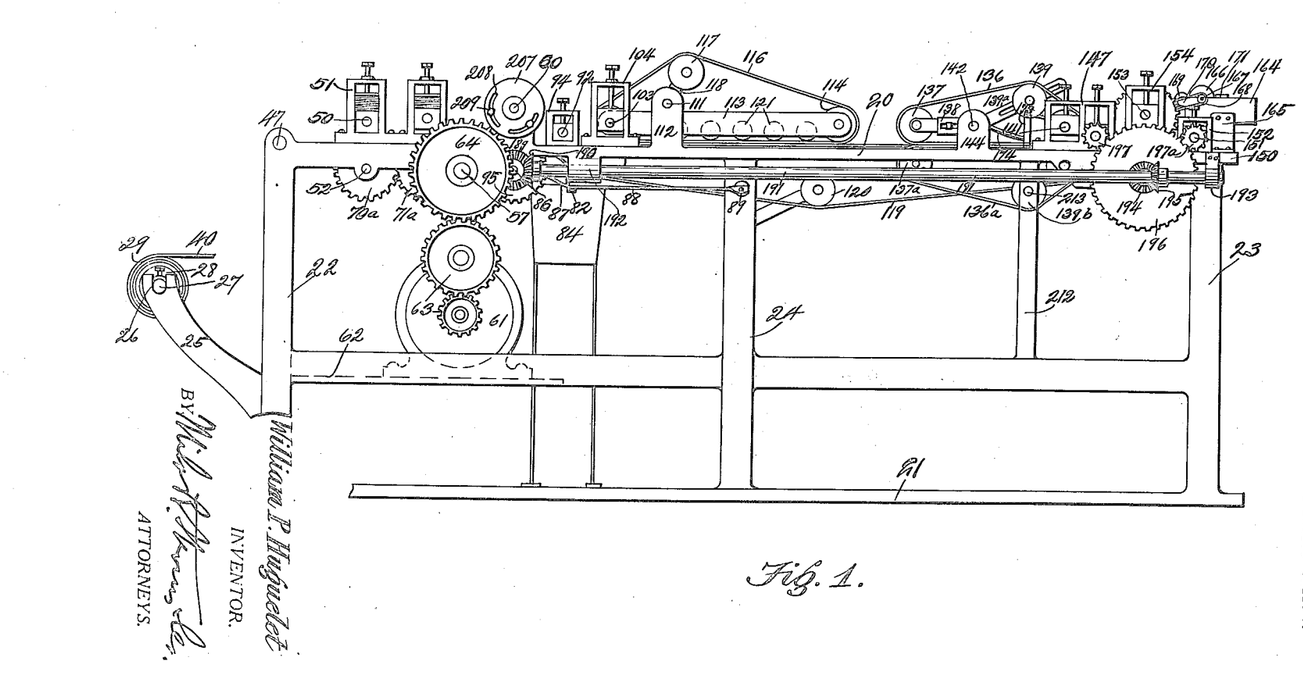
Figure 1 is an elevation of one side of the machine.
Figure 2:
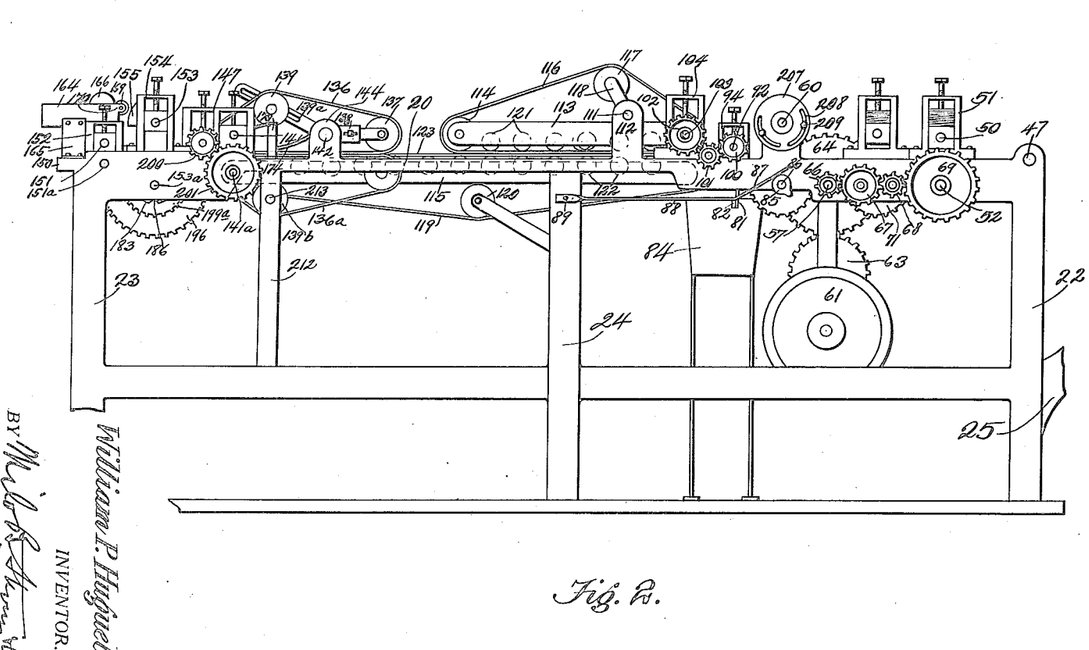
Fig. 2 is an elevation of the opposite side.
Figure 3:
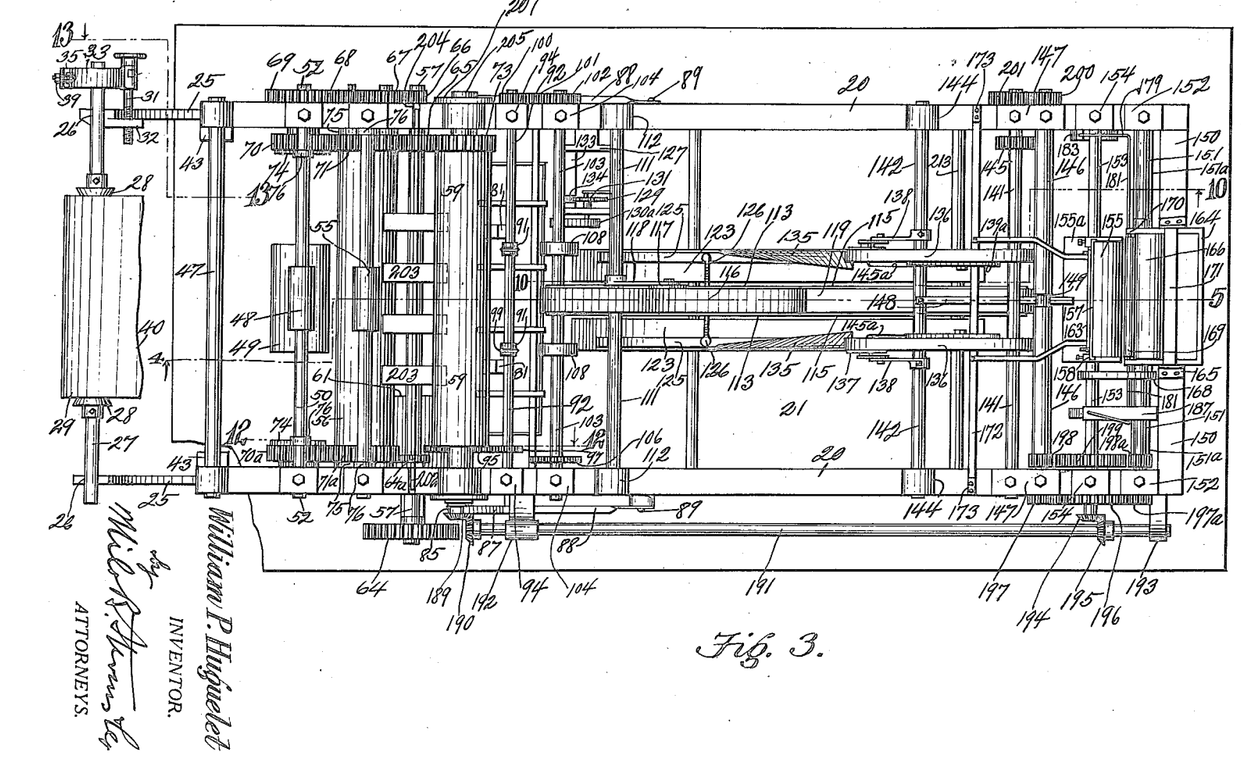
Fig. 3 is a plan view.
Figures 12, 13, 14:
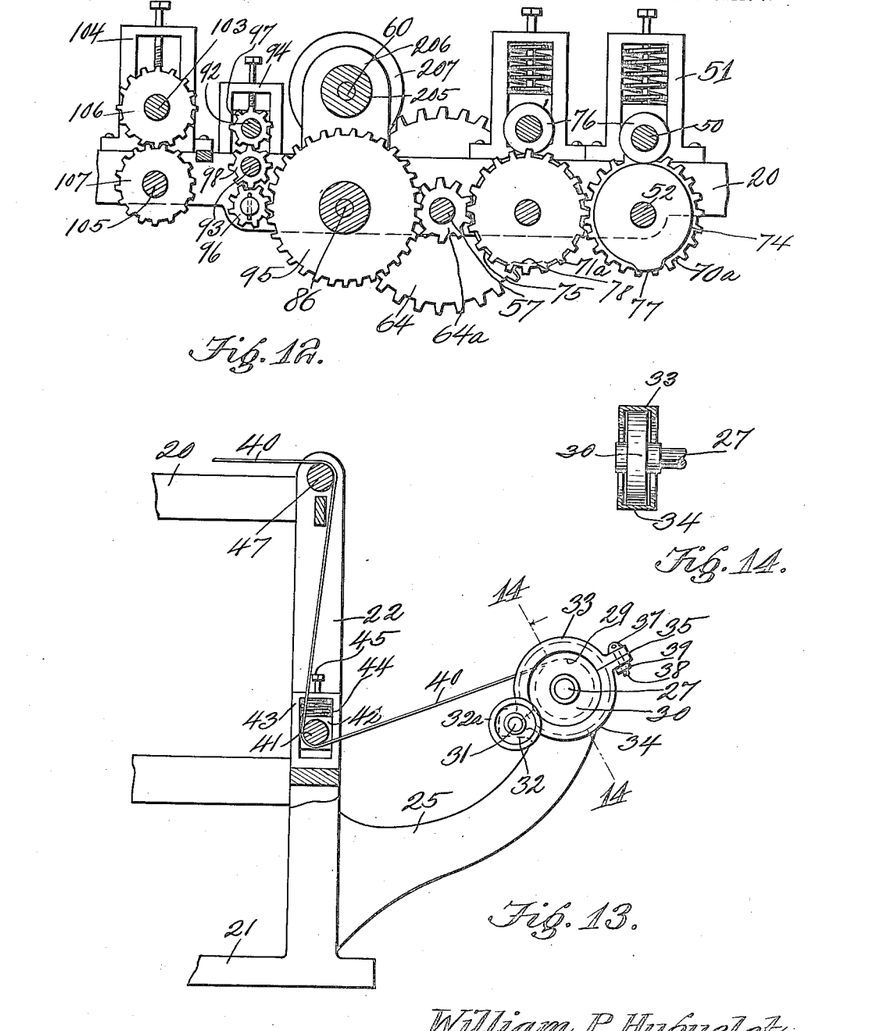
Figs. 12 and 13 are sectional details on the lines 12—12 and 13—13, respectively, of Fig. 3.
Fig. 14 is a section on the line 14—14 of Fig. 13.

Referring more particularly to Figs. 3 and 12, it will be noted that the roller 58 has a gear 95 mounted at the end opposite the gear 72, which gear 95 meshes with a pinion 96 carried by the top rail 20 and meshing with a pinion 98 on the shaft 93, said last mentioned pinion in turn being in mesh with a pinion 97 on the shaft 92. Thus, it will be seen that the shafts 92 and 93 are driven from the roller 58. The top roller 91 has a creaser rib 99, and the bottom roller has a groove corresponding to the rib, and when the blank passes therebetween it is scored or creased at the places hereinbefore described to define the side flaps of the blank.

The blank is next taken up by a feed device and carried along to a paste-applying device and a folder. A line of paste is applied on the inner face of one of the side flaps, and the two flaps, with the pasted flap on top, are folded and pressed together. The feed devices comprise the following parts: Back of the shaft 92, and extending parallel thereto, is a shaft 103 provided with a pair of laterally spaced rollers 108 which are in alinement with the creaser rollers 91. Below the shaft 103 is a parallel shaft 105 carrying feed rollers 108$^a$ located opposite the feed rollers 108. These feed rollers are driven from the shaft 92, the latter having a gear 100 at one end which is in mesh with an idler 101, the latter in turn being in mesh with a gear 102 on the shaft 103. The shaft 103 is journaled in adjustable bearings 104 and it is operatively connected to the shaft 105 by gears 106 and 107. The envelop blank passes between the rollers and is gripped thereby and propelled as it issues from the creaser rollers 91.

Midway between the ends of the shafts 103 and 105, and between the rollers 108 and 108$^a$ thereof is a pair of pulleys 109 and 110, respectively, located in superposed relation. Over the pulley 109 is trained a feed belt 116, and over the pulley 110 is trained a feed belt 119. The feed belt 116 is also trained over a pulley 114 located some distance rearwardly from the pulley 109, and the feed belt 119 is trained over a similar pulley 119$^a$ located some distance rearwardly of the pulley 114, the feed belt 119 therefore having a greater length than the feed belt 116. Back of the shafts 103 and 105 is a cross bar 111 the ends of which are fixed in blocks 112 on the top rails 20 of the frame. This bar supports two upstanding guard plates 113 located alongside the opposite edges of the feed belts 116 and 119 and extending parallel thereto in the direction of the length of the machine. One end of these plates is loosely mounted on the shaft 103 on opposite sides of the pulley 109, and the opposite end carries the pulley 114. Beneath the plates 113 are plates 115 of greater length than the upper plates 113, they extending almost to the rear end of the machine as shown more particularly in Fig. 5, the rear ends thereof being supported by a transverse shaft 141$^a$, and their forward ends by the shaft 105. The belt 116 is also provided with a tightening roller or idler 117 supported by an arm 118 adjustably mounted on the bar 111 as shown in Fig. 4. The bottom run of the belt 116 extends horizontally and frictionally engages with a top run of the belt 119, the latter being about twice the length of the belt 116 and extending rearwardly as far as the bottom ones 115 of the guard plates. A suitably positioned tightener or idler 120 is also provided for the belt 119. With the contiguous runs of the belts 116 and 119 in contact, frictional engagement is assured by a set of rollers 121 for the belt 116, and a similar set of rollers 122 for the belt 119. The rollers 121 and 122 are journaled in the corresponding guard plates 113 and 115, and they bear on the inner surfaces of the belts, thus assuring contact of the outer meeting surfaces of the belts. Beyond the belt 116, the rollers 122 serve to keep the top run of the belt 119 level throughout the remainder of its length.

At the sides of the belts 116 and 119 are two horizontal ways 123 for the purpose of supporting the projecting portions of the envelop blank carried by the belts. The receiving or forward end of these ways, as shown more clearly in Fig. 10, has a slight drop 124 to assure the entrance of the blank. Two guard strips 125, the receiving ends of which are deflected upward for the same reason, are held almost in touch with the ways by brackets 126 projecting from the guard plates 113, the object of the strips being to hold the blank down on the ways while moving thereon, and to prevent it from curling or swelling up. The ways 123 may be supported by the plates 115, suitable supporting brackets being provided.

Figure 10:
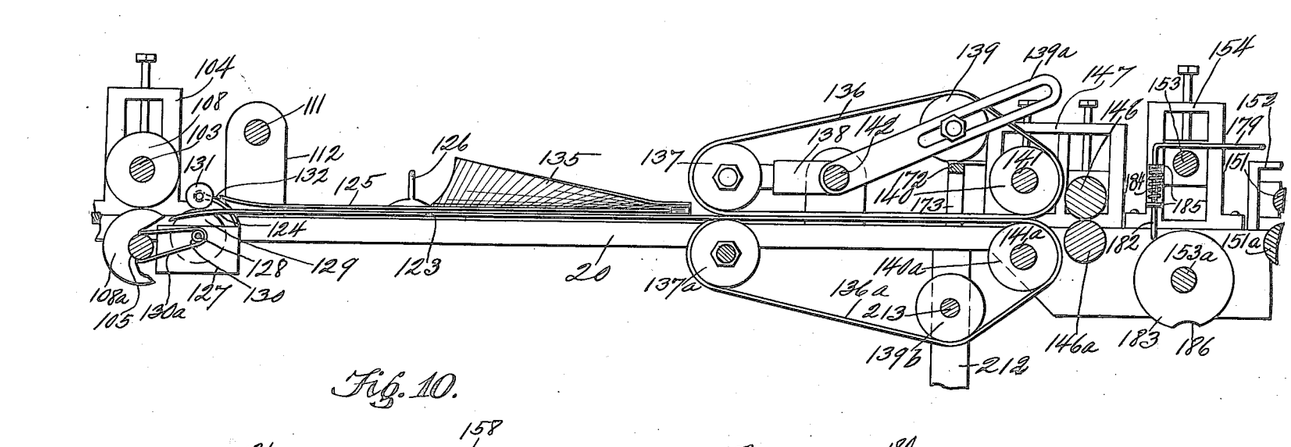
Fig. 10 is a section on the line 10—10 of Fig. 3.

At one side of the ways 123, slightly to the rear of the shafts 103 and 105, is a tank 127 holding a supply of gum or glue, said tank being suitably supported by the frame of the machine. One of the walls of the tank carries a spindle 128 on which is mounted a disk 129 located inside of the tank, and a pulley 130 on the outside of the latter. The disk dips into the gum in the tank and is kept in motion by a belt 130$^a$ connecting the pulley 130 with the shaft 105, as shown in Fig. 10. The top of the disk 129 is at the level of the traveling blank, i. e., the level of the ways 123, and above the disk is a small roller 131, the latter being held spaced a sufficient distance from the disk to let the blank pass. The roller 131 is supported by a suitable bearing bracket 132 extending from the tank 127. A plate 133 spanning the top of the tank 127 is slotted at 134 to accommodate the disk 129, this plate being for the purpose of holding back any excess of gum or paste that may be picked up by the disk during its rotation.

The paste-applying mechanism hereinbefore described is so located that the outer edge portion of one of the side flaps of the envelop blank comes between the disk 129 and the roller 131 as the blank enters the ways 123 and is pushed forward by the rollers 108 and 108ª, whereby a strip of paste or gum is applied to the under side of the flap. The roller 131, which is dry, serves to hold the flap down on the periphery of the disk 129 while the latter applies the gum or paste thereto.

The blank is now ready for the folding of the side flaps, which is accomplished by two projecting wings at the outer edge of the ways 123, said wings having a gradual inward curl toward their rear ends and overhanging the ways thereat. The wings gather the side flaps as the blank is carried along by the feed belts 116 and 119 and gradually fold the same over on the lines or creases made by the creaser rollers 91, down on the body of the blank. The folded portions of the blank, upon leaving the folder wings 135, pass between presser belts 136 and 136ª, two pairs of such belts being provided, one for each side of the blank. These belts carry the blank forward and press the folds, the middle portion of the blank being supported on the belt 119. The belts 136 pass over pulleys 137 and 140 and the belts 136ª pass over pulleys 137ª and 140ª. The pulley 137 is carried by a pair of telescopically connected arms 138. An idler 139 is also provided for the belt 136, the same being carried by a slotted arm 139ª. The pulleys 140 and 140ª of the belts 136 and 136ª respectively, are mounted on shafts 141 and 141ª, and the cross bar 142 carries the arms 138 and 139ª. The cross bar 142 is supported in blocks 144 on the top rails 20. The belts 136ª are provided with an idler 139ᵇ mounted on a shaft 213 carried by vertical members 212 of the frame of the machine. The shafts 141 and 141ª are operatively connected by gears 145 to turn in opposite directions. The ways 123 are cut out as indicated at 145ª in Fig. 3 to permit the belts 136 and 136ª to come together.

Closely following the pulleys 140 and 140ª in a rearward direction are two superposed rollers 146 and 146ª. The shaft 141 and the roller 146 are journaled in a double adjustable bearing 147, and the shaft 141ª and the roller 146ª are journaled in the top rails 20. The rollers 146 and 146ª are set close to take and draw the blank received therebetween as it issues from between the feed belts 136 and 136ª, giving the folded blank a pressing of metal to metal. In order to hold the blank down at the middle, before the presser rollers 146 and 146ª are reached, there is provided a strip 148 of spring metal secured to and projecting from the cross bar 142 and extending down upon that portion of the blank which lies on the belt 119. The strip also extends beyond the belt 119 and passes between the rollers 146 and 146ª, the same being peripherally grooved as indicated at 149 to permit the strip to extend between the same and a short distance to the rear thereof.

At the rear end of the frame of the machine is a cross rail 150, and adjacent thereto is located a pair of rollers 151 and 151ª, respectively, similar to the rollers 146 and 146ª, except that they are not grooved. The roller 151 is provided with an adjustable bearing 152, and the roller 151ª is journaled in the top rail 20. The rollers 151 and 151ª are set at the same height as the rollers 146 and 146ª, and they take and discharge the finished envelop.

The positioning of the various rollers, creasers, feed devices, etc., requires very little calculation in this machine, as only one vital thing must be kept in mind, i. e., the blank moves in one plane from one end of the machine to the other, this being horizontal; hence, the parts affecting the paper are governed, as to vertical position, by the paper line.

Midway between the rollers 146, 146ª and 151, 151ª are two vertically spaced shafts 153 and 153ª. The shaft 153 has adjustable bearings 154, and the shaft 153ª is journaled in the top rails 20. The shaft 153 carries a paste-applying device, and the shaft 153ª carries a plain roller 155ª. The paste-applying device 155 is in the form of a sector having the same diameter as the roller 155ª, so that its circumferential face may come in contact with the periphery of the roller. The sector 155 is adjustably mounted on the shaft 153, and on one of its radial faces is mounted a thin plate 157 having lateral end flanges 158. Two pins 159 project from this face of the sector through slots 160 in the plate, the protruding portions of the pins having a head, and an expanding coil spring 161 being mounted on the pins between the plate and the heads. This arrangement makes the plate 157 radially slidable within the limit of the slots 160, the spring 161 maintaining frictional engagement between the plate and the face of the sector, and a suitable lubricant being provided for smooth operation. The plate 157 is normally drawn outward by a coil spring 162 attached to the flange 158 at one end and anchored to the corresponding end of the sector. On the radial face of the plate 157 is secured a wiper strip 163 of rubber, the outer edge of which extends slightly beyond the outer edge of the plate.

Back of the sector 155 is located a tank 164 containing a supply of gum or paste, this tank being supported by two feet 165 on the cross rail 150. Near the forward edge of the tank is a partially immersed roller 166 journaled in the sides of the tank and having a shaft extension 167 for operative connection with the shaft 153 by means of a belt 168. The roller 166 frictionally actuates a smaller rubber roller 169 in front of it, the latter being journaled between two ears 170 projecting from the wall of the tank. The roller 169 is in the path of the projecting end of the strip 163, and at each revolution of the shaft 153 the strip wipes over the roller and takes up the gum solution or paste. The tank 164 has a guard strip 171 adjacent to the periphery of the roller 166 to hold back excess of paste.

Figure 11:
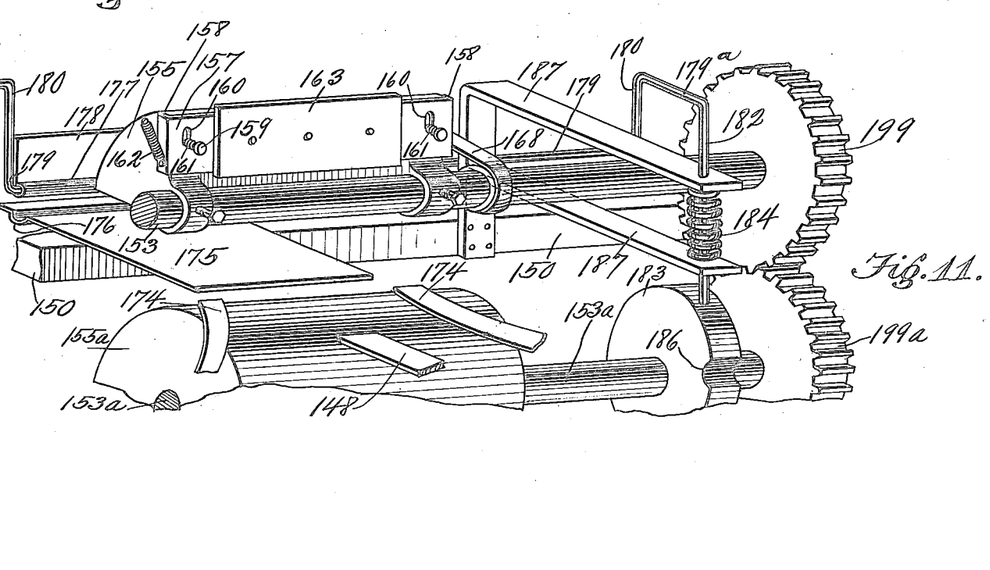
Fig. 11 is a perspective view of certain parts of the machine.

Referring to Figs. 5, 10 and 11, it will be noted that a cross bar 172 is located just ahead of the bearings 147, this cross bar being supported by two feet 173 on the top rails 20. Two thin strips 174, laterally spaced, extend rearwardly from this cross bar, gradually dropping down until their upper faces coincide with the paper line. Near the rollers 151 and 151ª these strips terminate in proximity to a base plate 175, the same being supported by a bracket 215 carried by the cross rail 150. Immediately in front of the rollers 151 and 151ª the base plate 175 is indented to form a transverse groove or channel 176 running parallel to said rollers. In vertical alinement with the channel 176 operates a reciprocatory deflector member comprising a vertical plate 178 having a curled bottom portion 177 in which is embedded a stiff rod 179. The rod projects from the ends of the plate and has upward bends 180 one of which terminates in an outward horizontal bend 181, and the other in a forward horizontal bend 179ª terminating in a downward bend 182, which latter is normally forced down into contact with the periphery of a cam 183 by a coil spring 184 connected at one end to the bend 182 and located between stationary flanges 185. The cam is a circular disk having a depression 186, and being fast on the shaft 153ª. As one side of the table is inaccessible by a direct bearing, there is provided a double bracket 187 secured to the cross rail 150 as shown in Fig. 11. The plate 178 is normally held above the channel 176 by the ends 182 of the wire riding on the periphery of the cams 183, and when the depression 186 comes opposite said ends, the plate 178 drops and seats the curled portion 177 in the channel. This action affects the envelop blank fed across the base plate 175 as will be described hereinafter.

Inside of the large drive gear 64 the protruding end of the shaft 86 of the roller 58 has a bevel pinion 189 which meshes with a similar pinion 190 mounted on the forward end of a shaft 191 extending in the direction of the length of the machine in a horizontal plane. A bearing bracket 192, near the front end, and another bearing bracket 193, near the rear end, extend from the top rail 20 and support the shaft 191. Near the rear end the shaft 191 is operatively connected to the shaft 153ª by level pinions 194 and 195, said shaft 153ª also carrying a large gear 196 with which mesh pinions 197 and 197ª on the rollers 146 and 151. These rollers also carry pinions 198 and 198ª for driving connection with the mating rollers 146ª and 151ª. In the plane of the pinions 198 the shafts 153 and 153ª carry intermeshing gears 199 and 199ª. The roller 146 is also provided with a pinion 200 which meshes with a gear 201 on the shaft 141ª of the pulleys 140ª. Thus, it will be seen that the power source drives the active parts of the forward portion of the machine through the shaft 57 and actuates the parts at the rear end of the machine through the shaft 191.

Two supports for the blank as it moves from one active part to another are also provided and shown more clearly in Fig. 3. One of these supports comprises a long cross bar 202 having a series of laterally spaced transverse plates 203 secured on top thereof. The ends of the bar 202 seat in slots 204 cut in the top rails 20 and at such a depth as to locate the plates 203 flush with the paper line. The other device is substantially similar to the one described. These supporting devices are in common use on paper feeding machines and a further description thereof is therefore thought unnecessary.

Figures 7, 8:
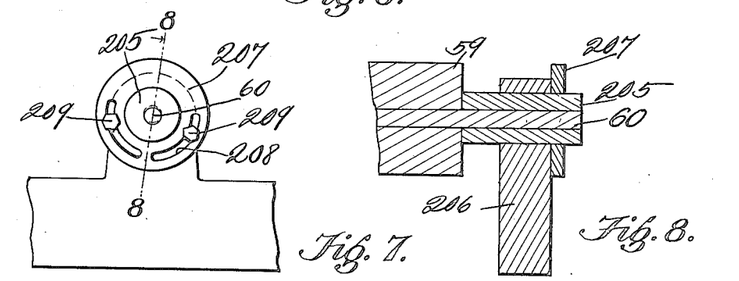
Fig. 7 is an end view of certain parts shown in Fig. 6.
Fig. 8 is a vertical section on the line 8—8 of Fig. 7.

As hereinbefore stated, the cutting roller 59 is journaled in a special bearing so constructed that it permits a close adjustment of the roller in a direction parallel to its axis. The necessity for accurate adjustment in this direction is clearly obvious when it is considered that the impressing and cutting members must be made to register correctly. This special bearing is illustrated in Figs. 7 and 8, one such bearing being provided for each end of the shaft. It will be understood that the adjustment referred to is not sufficient to affect the meshing of the gears 72 and 73. Referring specifically to Figs. 7 and 8, the bearing for the shaft 60 of the roller 59 is shown at 205, the same being a circular sleeve the bore of which is slightly off the center. The sleeve fits into a support 206 on the top rail 20 and has a circular flange 207 at its outer end. It will be seen that by turning the flange 207 the position of the roller 59 may be slightly shifted as explained hereinbefore. In order to fix the roller in adjusted position, the flange 207 has two arcuate slots 208 through each of which a bolt 209 is passed and threaded into the support 206. By slightly backing these bolts the flange may be turned to effect the adjustment of the roller.

Figure 15:
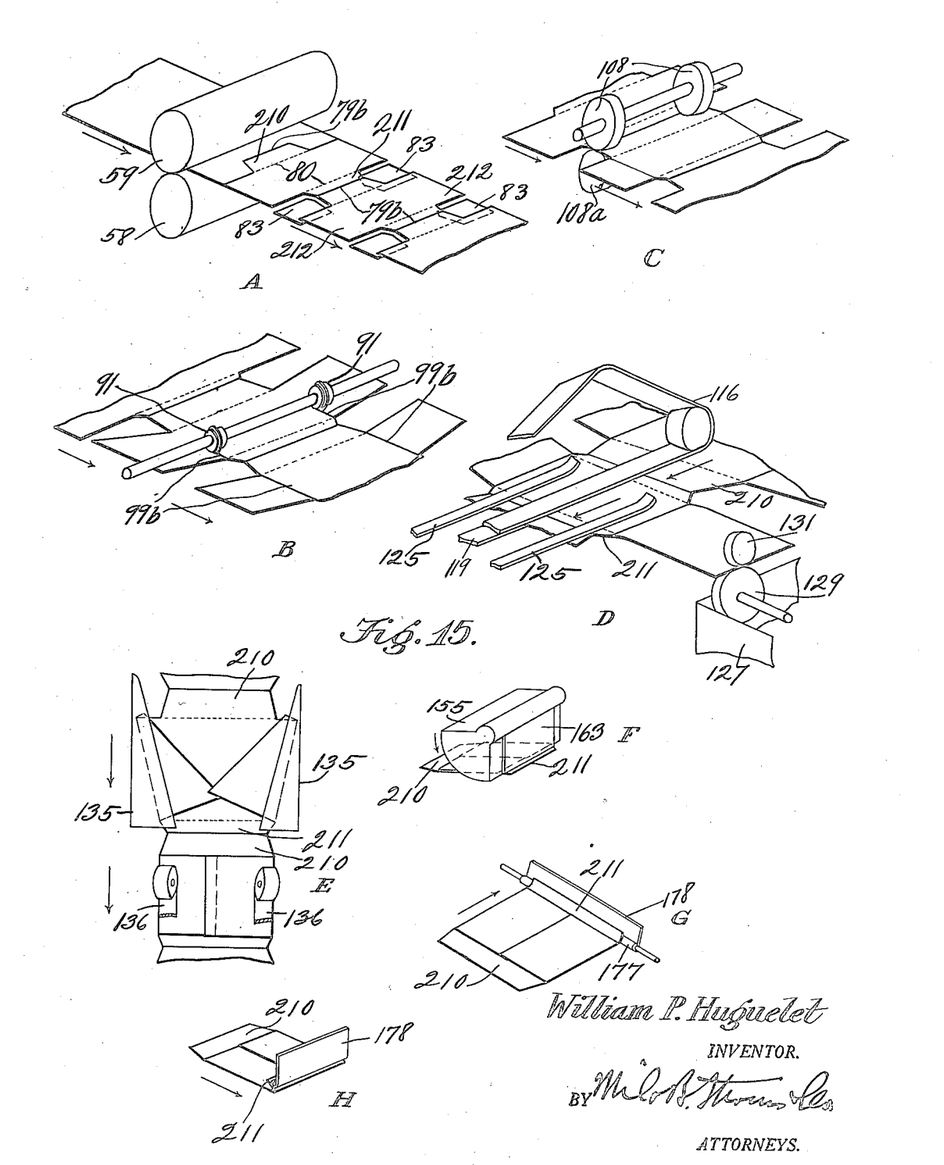
Fig. 15 is a diagram illustrating the operation of the machine.

The operation of the machine may be summarized as follows, special reference being had to Fig. 15 of the drawing in which the various steps are illustrated diagrammatically: When the paper strip issues from between the cutting rollers 58 and 59, as shown creased or scored on the dotted line 80 and portions 83 have been cut from the edges of the strip. Thus, a blank is formed having side flaps 212 and top and bottom flaps 210 and 211, respectively. This feature renders the process very economical as only the small cut outs 83 are wasted, these being removed as explained hereinbefore. The blank next encounters the creasing rollers 91 which impress two creases 99[b] to define the side flaps 212 as shown at B. Passing on, the blank is engaged by the feed belts 116 and 119, the side rollers 108 and 108[a] in the meantime holding the paper firmly at the sides as shown at C, these rollers keeping the paper moving at the proper speed irrespective of any possible slippage of the belts. While moving as last described, the under side of one of the side flaps 212 is gummed as shown at D. The blank next encounters the folding wings 135, and the gummed side flap is first folded on the body of the blank, and the other side flap is then folded over on top of the first folded flap. Next, the two flaps are pressed down firmly at the outer edge by the belts 136 and 136[a] as shown at E, and the flaps are further pressed by the strip 148 and the rollers 146 and 146[a]. Upon mounting the roller 155[a] the strip 163 wipes the flap 211, leaving the same coated, this action being shown at F. At this instance the cam 183 allows the plate 178 to drop into the channel 176 of the base plate 175 so that the plate 178 now extends across the path of the advancing blank. The gummed flap in advancing and striking the curl 177 of the plate 178 is deflected upwardly as shown at G. The plate 178 now rises back to its original position, it being low enough in such position to cause the flap 211 to turn back on the body of the blank and the folded side flaps as shown at H. With the flap 211 so deflected, further advance of the blank will cause the rollers 151 and 151[a] to engage and firmly press the flap down and discharge the blank in the form of the finished envelop. The flap 210 defined by the crease 80[b] may be left extended to enable the envelop to be filled with ease.

I claim:—

1. In an envelop machine, a cutter for forming an envelop blank from a strip of paper, the cutter being shaped to cut out opposite portions at the side edges of the strip and to sever the strip transversely in line with said cut-out portions, thereby producing a blank having side flaps of a length to overlap when folded, and top and bottom flaps, means for creasing the blank transversely in line with the opposite edges of the cut-out portions to define the top and bottom flaps, means independent of the aforesaid cutter and creasing means and operating thereafter for creasing the blank longitudinally in line with the cut-out portions to define the side flaps, means for applying paste to the under side of one of the side flaps, means for folding said flap on the body of the blank, means for folding the other side flap on top of the said folded side flap, and means for folding and pasting the bottom flap over on the folded and pasted side flaps.

2. In an envelop machine, a cutter for forming an envelop blank from a strip of paper, the cutter being shaped to cut out opposite portions at the side edges of the strip and to sever the strip transversely in line with said cut-out portions, thereby producing a blank having side flaps of a length to overlap when folded, and top and bottom flaps, means for creasing the blank transversely in line with the opposite edges of the cut-out portions to define the top and bottom flaps, means independent of the aforesaid cutter and creasing means and operating thereafter for creasing the blank longitudinally in line with the cut-out portions to define the side flaps, means for applying paste to the under side of one of the side flaps, means for folding said flap on the body of the blank, means for folding the other side flap on top of the said folded side flap, means for folding and pasting the bottom flap over on the folded and pasted side flaps, and actuating connections between the aforesaid means to cause their operation in the order named.

3. In an envelop machine, a feed belt, a resilient hold-down strip engaging the discharge end of the belt and projecting therebeyond, and superposed feed rollers mounted to the rear of the discharge end of the belt, between which rollers the projecting end of the strip extends, one of the rollers having a peripheral groove through which the strip extends.

4. In an envelop machine, a paste-applying means comprising a rotatable member having a plane face extending radially with respect to said member, a radially yieldable plate mounted on said face and provided with slots, pins projecting from said face of the member and passing through the slots, the protruding portion of the pins having heads, expanding coil springs mounted on the pins between said heads and the plate, resilient means for normally drawing the plate outwardly, a wiper carried by the plate and projecting beyond the plane of the periphery of the rotatable member, and means for feeding an envelop blank past the rotatable member tangentially with respect to the circular path described by the wiper.

In testimony whereof I affix my signature.

WILLIAM P. HUGUELET.